United States Patent
Withanawasam

(10) Patent No.: US 6,877,237 B1
(45) Date of Patent: Apr. 12, 2005

(54) METHOD AND SYSTEM FOR ACQUIRING CALIBRATION DATA FOR AN ELECTRONIC COMPASS

(75) Inventor: Lakshman S. Withanawasam, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/794,355

(22) Filed: Mar. 5, 2004

(51) Int. Cl.$^7$ .............................................. G01C 17/38
(52) U.S. Cl. ........................................ 33/356; 73/1.76
(58) Field of Search ............................... 33/355 R, 356, 33/357, 502; 73/1.76

(56) References Cited

U.S. PATENT DOCUMENTS

| | | | | |
|---|---|---|---|---|
| 4,698,912 A | * | 10/1987 | Fowler et al. | 33/356 |
| 4,720,992 A | * | 1/1988 | Hormel | 73/1.76 |
| 4,807,462 A | * | 2/1989 | Al-Attar | 73/1.76 |
| 5,187,872 A | | 2/1993 | Dufour | |
| 5,287,297 A | * | 2/1994 | Ihara et al. | 33/356 |
| 5,305,236 A | * | 4/1994 | Germanetti | 33/356 |
| 5,564,193 A | * | 10/1996 | Brooks | 33/302 |
| 5,946,813 A | * | 9/1999 | Nachbaur et al. | 33/357 |
| 5,990,679 A | * | 11/1999 | Frommer et al. | 33/356 |
| 6,539,639 B1 | | 4/2003 | Smith | |
| 2003/0023380 A1 | | 1/2003 | Woloszyk et al. | |
| 2004/0020064 A1 | * | 2/2004 | Levi et al. | 33/319 |
| 2004/0107590 A1 | * | 6/2004 | Russell et al. | 33/313 |
| 2004/0149004 A1 | * | 8/2004 | Wu | 73/1.75 |

OTHER PUBLICATIONS

Caruso et al., A New Perspective on Magnetic Field Sensing, May 1998.
Digital Compass Solutions, HMR3200/HMR3300, Honeywell International Inc., Feb. 2003.
Digital Compass Module HMR 3000, Honeywell International Inc., Dec. 1999.
HMR3000 Digital Compass Module User's Guide, Honeywell International Inc., Mar. 2001.
Smart Digital Magnetometer HMR 2300, Honeywell International Inc., Jun. 1997.
Caruso and Withanawasam, Vehicle Detection and Compass Applications using AMR Magnetic Sensors, Honeywell International Inc., May 1999.
Digital Compass Solution HMC 6352, Honeywell International Inc., May 2003.

* cited by examiner

Primary Examiner—G. Bradley Bennett
(74) Attorney, Agent, or Firm—McDonnell Boehnen Hulbert & Berghoff LLP

(57) ABSTRACT

A method and system is presented for acquiring calibration data for a three-axis electronic compass by positioning and rotating the compass so that each sensitive axis in the compass experiences variation in the magnetic field while rotating the compass. Acquiring the calibration data occurs by measuring output signals that reflect the magnetic fields acting on the electronic compass while rotating the compass. Positioning of the compass includes moving the compass so that at least one of the sensitive axes travels a path that approximately forms a cone when the compass is rotated around a gravity vector. Calibration data from three sensitive axes experiencing variation in the magnetic field is available during a single rotation of the compass.

24 Claims, 5 Drawing Sheets

METHOD AND SYSTEM FOR ACQUIRING CALIBRATION DATA FOR AN ELECTRONIC COMPASS

BACKGROUND

1. Field of Invention

This invention relates generally to electronic compasses and more particularly to a method and system for improving electronic compass calibration.

2. Description of Related Art

Electronic compasses are well known in the art for determining a geographical direction by detecting the Earth's magnetic field. Electronic compasses use magnetic field sensors to detect the Earth's magnetic field. The Earth's magnetic field may be described by the direction and intensity of the magnetic field. The direction and intensity of the magnetic field can be identified by vector components. At the equator, the Earth's magnetic field is entirely a horizontal vector component with no vertical (up and down) vector component. At positions north or south of the equator, the Earth's magnetic field consists of both horizontal and vertical vector components.

Electronic compasses are used in a variety of applications such as automobiles, aircraft, marine vehicles, and personal handheld devices. The level of compass accuracy in calculating a geographical direction varies per application. Lower levels of compass accuracy can be achieved using a compass with two sensitive axes. Such a compass is required to be kept level and any tilt will result in loss of compass accuracy. Higher levels of compass accuracy can be achieved using a compass with three sensitive axes. These compass implementations use some type of gravity sensing device to maintain compass accuracy with tilt. The three sensitive axes in a three-axis compass are commonly referred to as the x-axis, y-axis, and z-axis. Typically, the x-axis and y-axis sensitive axes are arranged to detect the horizontal vector component of the Earth's magnetic field and the z-axis sensitive axis is arranged to measure the vertical vector component of the Earth's magnetic field. The three sensitive axes of a three-axis compass are typically arranged to be mutually orthogonal (at right angles). Each sensitive axis of an electronic compass is contained in a magnetic field sensor. A magnetic field sensor may include more than one sensitive axis. A variety of magnetic field sensors are available for electronic compassing. Examples of magnetic field sensors in electronic compasses include flux-gate sensors, Hall-effect sensors, and magnetoresistive sensors.

The Earth's magnetic field is susceptible to distortion from other magnetic sources. For example, hard and soft iron effects from a variety of magnetic sources may distort the Earth's magnetic field. The distortion of the Earth's magnetic field can cause an electronic compass to determine a geographical direction that does not reflect the true geographical direction. Calibration procedures for electronic compasses have been developed in order to compensate for the hard and soft iron effects that distort the Earth's magnetic field. The calibration procedures depend on a variety of factors, such as the type of compass application (car, boat, hand-held, etc.) and/or the number of magnetic field sensor sensitive axes in the compass.

The quality of a compass calibration procedure depends in part on the process used to obtain calibration data. A process for obtaining calibration data typically involves rotating the compass in a specific manner. By rotating the compass, a sensitive axis in the compass may experience a variation of the magnetic field acting on the sensitive axis. The variation of the magnetic field refers to changes in the intensity and directionality of a magnetic field arising from the sensitive axis moving in relation to the magnetic field acting on the sensitive axis.

The currently known calibration procedures that provide a variation of the magnetic field in the sensitive axes have limitations. For example, a first compass calibration procedure for acquiring calibration data includes pointing a compass in three known directions. A limitation of the first compass calibration procedure is that the Earth's magnetic field is sampled in only three directions. Another example is a second compass calibration procedure for acquiring calibration data that includes calibrating a compass by moving the compass in a complete circular path. The second compass calibration procedure may be acceptable for a compass with two sensitive axes because a variation of the magnetic field in the two sensitive axes can be achieved. However, the second calibration procedure does not guarantee that all three sensitive axes of a three-axis compass will experience variation while moving the compass in the complete circular path. Yet another example is a third compass calibration procedure for acquiring calibration data that includes rotating the compass at a steady speed through 360 degrees with as many pitch and roll orientations as possible. The pitch and roll orientations require moving the compass so that the sensitive axes of the compass and a gravity vector form an angle that varies while the compass is rotating through the 360 degrees. Providing the pitch and roll orientations to achieve a varying angle increases the complexity of acquiring calibration data. One more example is a fourth compass calibration procedure for acquiring calibration data that includes rotating a three-axis compass with three mutually orthogonal sensitive axes in two circular paths. The first circular path of the fourth compass calibration procedure is a circular path in a horizontal plane when a first pair of sensitive axes is in the horizontal plane. The second circular path of the fourth compass calibration procedure is a circular path in the horizontal plane when a second pair of sensitive axes is in the horizontal plane. Changing from the first pair to second pair of sensitive axes in the horizontal plane typically involves rotating the compass 90 degrees. The two-circular-path procedure requires two rotational steps to provide a variation in all three sensitive axes. Two steps are required because the sensitive axis orthogonal to the horizontal plane in each step does not experience a variation in the magnetic field when rotating the compass in the circular paths. Instead the sensitive axis orthogonal to the horizontal plane rotates about a single point.

It would be helpful to have a method and system for acquiring calibration data for a three-axis electronic compass where each of the three sensitive axes experiences a variation in the magnetic field during the acquisition process without having to move the compass in two circular paths and/or without having to move the compass with a pitch and roll motion.

SUMMARY

The present invention provides an improved method and system for acquiring calibration data for a three-axis electronic compass. Ideally, the acquisition of calibration data occurs without any unnecessary physical movements of the compass.

The first embodiment of the present invention pertains to an electronic compass having a first sensitive axis, a second sensitive axis, and a third sensitive axis. The electronic compass may include one or more magnetic field sensors to house the first, second, and third sensitive axes. According to the first embodiment, a method of acquiring calibration data for the electronic compass includes positioning the compass so that the first sensitive axis and a gravity vector form an angle greater than 0 degrees and less than 90 degrees. Alternatively, the second and third sensitive axes may be chosen as the sensitive axis forming the angle, greater than 0 degrees and less than 90 degrees, with the gravity vector. The gravity vector is a vector passing through the compass in a direction substantially towards the center of Earth. The second and third sensitive axes also form a respective angle with the gravity vector.

The method of the first embodiment includes moving the compass in a substantially 360 degree path around the gravity vector. Moving the compass causes each sensitive axis in the compass to traverse a path. If a sensitive axis and the gravity vector form an angle greater than 0 degrees and less than 90 degrees, the sensitive axis traverses a path that creates a cone when moving the sensitive axis around the gravity vector. The gravity vector is the axis of the cone. If a sensitive axis and the gravity vector form a 90 degree angle, the sensitive axis traverses a path that forms a circle when rotating the sensitive axis around the gravity vector. The gravity vector passes through the center of the circle. If the angle between the sensitive axis and the gravity vector is 0 degrees, the sensitive axis rotates along its own axis and experiences no variation in the magnetic field when moving the compass around the gravity vector. The maximum variation in the magnetic field in all three sensitive axes occurs when at least one of the sensitive axes and the gravity vector form a 45 degree angle. Maximum variation in the magnetic field in all three sensitive axes allows for acquiring the optimal calibration data.

Furthermore, moving the compass in a substantially 360 degree path can occur using continuous or non-continuous motions. An example of continuous motion is moving the compass in the 360 degree path without stopping compass movement during the 360 degree path. An example of non-continuous motion is moving the compass some amount of degrees greater than 0 degrees and less than 360 degrees, stopping the compass movement, and then restarting the compass movement to complete the 360 degree path. Moving the compass in a complete 360 degree path allows for acquiring optimal calibration data because a 360 degree path allows for acquiring calibration data in a greater variety of directions.

The method of the first embodiment also includes measuring a magnetic field acting on the first, second, and third sensitive axes while moving the compass in the substantially 360 degree path to acquire the calibration data. Measuring the magnetic field includes sampling output signals that reflect the magnetic field acting on the first, second, and third sensitive axes. Sampling output signals may occur at various rates. For example, sampling the output signal may occur continuously during the sampling process. Another example is sampling the output signal once per second during the sampling process. Other sampling rates are also available. A variety of output signal types may be measured. For example, the output signals may be single ended. Another exemplary output signal type is differential signals. Other signal types are also possible such as digital output signals. In the exemplary embodiment, the first, second, and third sensitive axes are within one or more magnetic field sensors that produce the first, second, and third output signals. Alternatively, the first, second, and third sensitive axes may produce the output signals directly. In the first embodiment, measuring the output signals includes taking approximately 100 samples of the first, second, and third output signals as the compass is rotated around the gravity vector. Alternatively, an amount of samples less than or greater than 100 samples from each output signal can also be taken during the compass rotation. The amount of samples taken may depend on a variety of factors, such as the sampling rate, the type of calibration algorithm using the calibration data, the computational capability of the data processor, and the desired level of calibration accuracy. Other factors may also determine the number of samples taken.

The method of the first exemplary embodiment can also include initiating a calibration mode. For example, the compass user may perform a combination of button presses on a compass to initiate the calibration mode. Upon initiating the calibration mode, the compass can begin measuring a magnetic field to obtain magnetic field measurements. The compass can then store the measurement values or some numerical value derived from the measurement values as calibration data. In a second embodiment of the present invention, a method of acquiring calibration data for an electronic compass with a first sensitive axis, a second sensitive axis, and a third sensitive axis is presented. The first, second, and third sensitive axes are mutually orthogonal. When one sensitive axis is in the vertical position, the other two sensitive axes are in horizontal positions. The electronic compass produces a first, second, and third output signal that reflects a magnetic field acting on the first, second, and third sensitive axes. The method of the second embodiment includes positioning the compass so that the first sensitive axis, the second sensitive axis, and the third sensitive axis are not parallel with a gravity vector passing through the compass. The gravity vector is a vector passing through the compass in a direction substantially towards the center of Earth. The method of the second embodiment also includes moving the compass in a substantially 360 degree path around the gravity vector so that at least one of the first, second, and third sensitive axes traverses a path forming substantially a cone. The gravity vector is approximately an axis of the cone. While the compass is moving in the substantially 360 degree path, samples of the first, second, and third output signals are taken to obtain values of the output signals while rotating the compass around the gravity vector. The values of the output signals are calibration data which may be stored in data storage. Alternatively, the value of the output signals or a subset of the values of the output signals may be processed in one or more algorithms to produce the data which will be stored in data storage as calibration data. A variety of data storage devices may be used to store the calibration data. For example, electronically erasable programmable read only memory (EEPROM) may be used. Other types of data storage are also available.

A third exemplary embodiment of the present invention is a system for maneuvering a compass having a first sensitive axis, a second sensitive axis, and a third sensitive axis. The third exemplary embodiment provides a device for positioning and rotating the compass. The device provides for positioning the first sensitive axis with respect to a gravity vector so that the first sensitive axis and the gravity vector form a first angle greater than 0 degrees and less than 180 degrees. The device also provides for positioning the second sensitive axis with respect to the gravity vector so that the second sensitive axis and the gravity vector form a second angle greater than 0 degrees and less than 180 degrees. And, the device provides for positioning the third sensitive axis with respect to a gravity vector so that the third sensitive axis and the gravity vector form a third angle greater than 0 degrees and less than 180 degrees. Optimal calibration data is available when one or more of the first, second, and third angles is equal to 45 degrees. Furthermore, the device provides for rotating the compass in a substantially 360 degree path around the gravity vector while keeping the first, second, and third angles fixed throughout the 360 degree path. The device may also include the ability to stop moving the compass after the compass has moved in the substantially 360 degree path. Other elements of the third exemplary embodiment include a first component to position the compass and a second component to rotate the compass. Alternatively, the device may allow for positioning and rotating a plurality of compasses to obtain calibration data from the plurality of compasses.

These as well as other aspects and advantages of the invention will become apparent to those of ordinary skill in the art by reading the following detailed description, with reference where appropriate to the accompanying drawings. Further it should be understood that the embodiments noted in this summary are not intended to limit the scope of the invention as claimed.

BRIEF DESCRIPTION OF THE DRAWINGS

An exemplary embodiment of the present invention is described herein with reference to the following drawings, in which.

DETAILED DESCRIPTION

An electronic compass may include one or more magnetic field sensors for detecting the magnetic fields that act on the electronic compass. The number of magnetic field sensors in an electronic compass and the number of sensitive axes in each magnetic field sensor may vary. The orientation (directionality) of the one or more sensitive axes in each electronic compass may vary as well. A three-axis electronic compass has three sensitive axes that are typically designated as an x-axis sensitive axis, a y-axis sensitive axis, and a z-axis sensitive axis. Assigning the x-axis, y-axis, and z-axis designations to the respective sensitive axes is for descriptive purposes and is entirely arbitrary as to which sensitive axis is the x-axis, y-axis, or z-axis.

Figure 1A:
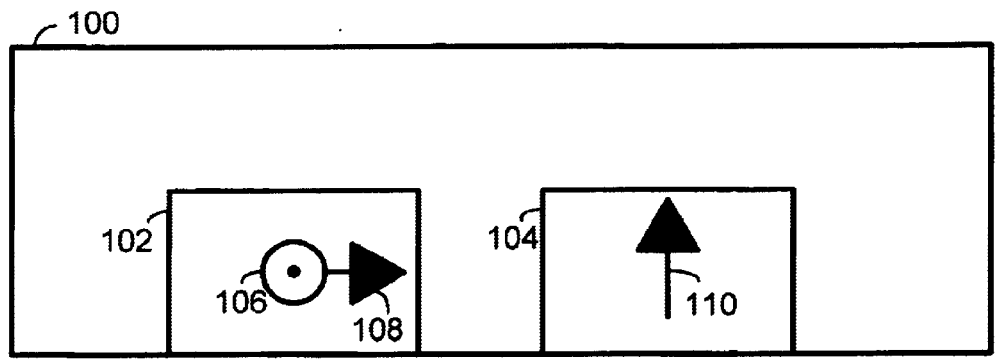
FIG. 1A illustrates an elevation view of a circuit board layout of a compass with three sensing axes.
Figure 1B:
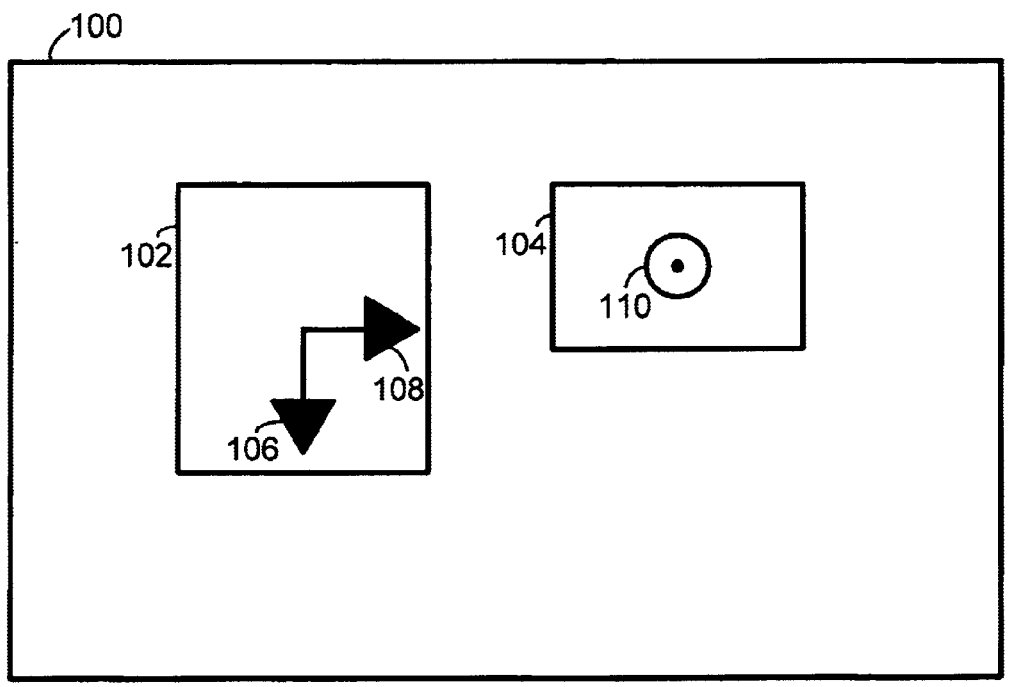
FIG. 1B illustrates the plan view of the circuit board layout of FIG. 1A.

FIGS. 1A and 1B illustrate the layout of two magnetic field sensors in an exemplary three-axis electronic compass. FIG. 1A is an elevation view of the exemplary electronic compass 100. The electronic compass 100 includes a first magnetic field sensor 102 and a second magnetic field sensor 104. The first magnetic field sensor 102 includes an x-axis sensitive axis 106 and a y-axis sensitive axis 108. The x-axis sensitive axis 106 and the y-axis sensitive axis 108 are in the same plane and are mutually orthogonal. The second magnetic field sensor 104 includes a z-axis sensitive axis 110. The z-axis sensitive axis 110 is mutually orthogonal to the x-axis sensitive axis 106 and the y-axis sensitive axis 108.

FIG. 1B is a plan view of the exemplary three-axis electronic compass 100 showing the first and second magnetic field sensors 102 and 104. The first magnetic field sensor 102 includes the mutually orthogonal x-axis sensitive axis 106 and the y-axis sensitive axis 108. The second magnetic field sensor 104 includes the z-axis sensitive axis 110. Alternative layouts for three-axis electronic compasses are available. For example, a three-axis electronic compass may include three individual magnetic field sensors each having a respective sensitive axis. Yet another example is a three-axis electronic compass with one magnetic field sensor that includes three sensitive axes.

Figure 2A:
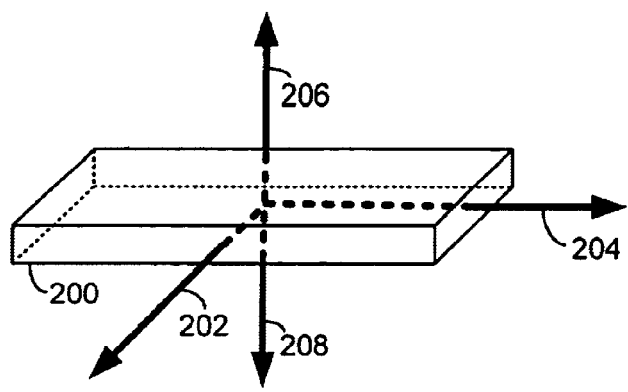
FIG. 2A, FIG. 2B, and FIG. 2C illustrate a gravity vector in relation to a variety of orientations of a compass with three sensitive axes.
Figure 2B:
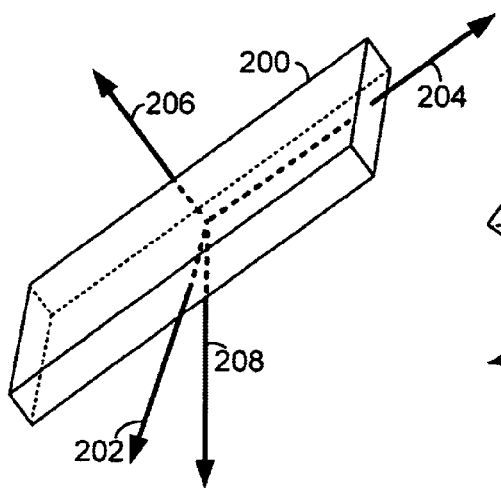
Figure 2C:
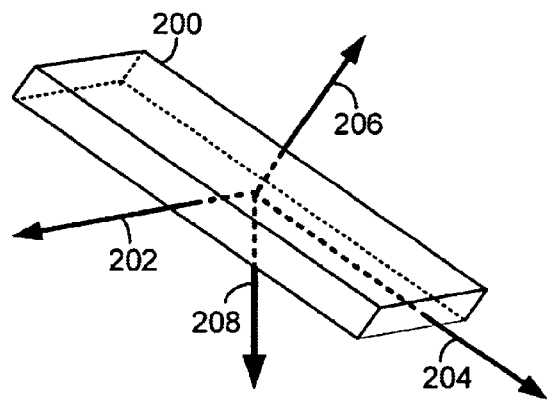

In understanding the present invention, it is also helpful to understand the positioning of the sensitive axes of an electronic compass in relation to a gravity vector as the electronic compass is placed in a variety of positions. FIGS. 2A, 2B, and 2C illustrate various positions of a three-axis electronic compass and the positions of the sensitive axes after moving the electronic compass in relation to a gravity vector. FIG. 2A illustrates an electronic compass 200 in a first position. The electronic compass 200 includes a first sensitive axis (x-axis) 202, a second sensitive axis (y-axis) 204, and a third sensitive axis (z-axis) 206. The first sensitive axis (x-axis) 202, the second sensitive axis (y-axis) 204, and the third sensitive axis (z-axis) 206 do not actually extend beyond the electronic compass 200, but are shown to extend beyond the electronic compass 200 in FIGS. 2A, 2B, and 2C for illustrative purposes. Furthermore, the first sensitive axis (x-axis) 202, the second sensitive axis (y-axis) 204, and the third sensitive axis (z-axis) 206 are not required to intersect as shown. Instead, the first sensitive axis (x-axis) 202, the second sensitive axis (y-axis) 204, and the third sensitive axis (z-axis) 206 extend to a common point to illustrate that the first sensitive axis (x-axis) 202, the second sensitive axis (y-axis) 204, and the third sensitive axis (z-axis) 206 are mutually orthogonal. Placing the three sensitive axes to be mutually orthogonal is preferred but not essential to the present invention. In FIG. 2A, the first sensitive axis (x-axis) 202 and the second sensitive axis (y-axis) 204 are orthogonal to a gravity vector 208. The gravity vector 208 points at the center of earth (shown as a downward direction in FIGS. 2A, 2B, and 2C) for any given position of the electronic compass 200.

FIG. 2B illustrates the three-axis electronic compass 200 of FIG. 2A after moving the compass to a second position. In the second position, the first sensitive axis (x-axis) 202, the second sensitive axis (y-axis) 204, and the third sensitive axis (z-axis) 206 remain to be mutually orthogonal. However, in the second position as compared to the first position, the first sensitive axis (x-axis) 202, the second sensitive axis (y-axis) 204, and the third sensitive axis (z-axis) 206 are no longer orthogonal to a gravity vector 208. The gravity vector 208 remains pointing at the center of earth even though the electronic compass 200 has been moved to the second position.

FIG. 2C illustrates the three-axis electronic compass 200 of FIG. 2A after moving the compass to a third position. In the third position, the first sensitive axis (x-axis) 202, the second sensitive axis (y-axis) 204, and the third sensitive axis (z-axis) 206 remain to be mutually orthogonal. However, in the third position, the second sensitive axis (y-axis) 204 and the third sensitive axis (z-axis) 206 are no longer orthogonal to a gravity vector 208. The gravity vector 208 remains pointing at the center of earth even though the electronic compass 200 has been moved to the third position.

Figure 3A:
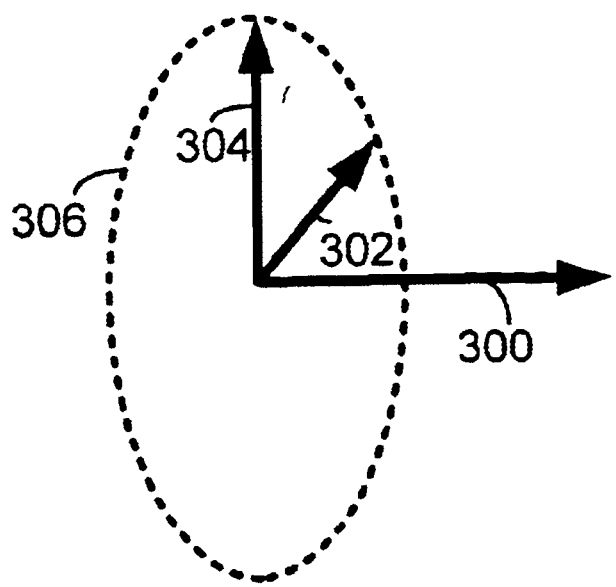
FIG. 3A and FIG. 3B illustrate paths traveled by the sensitive axes in a three-axis compass using a prior art calibration method.
Figure 3B:
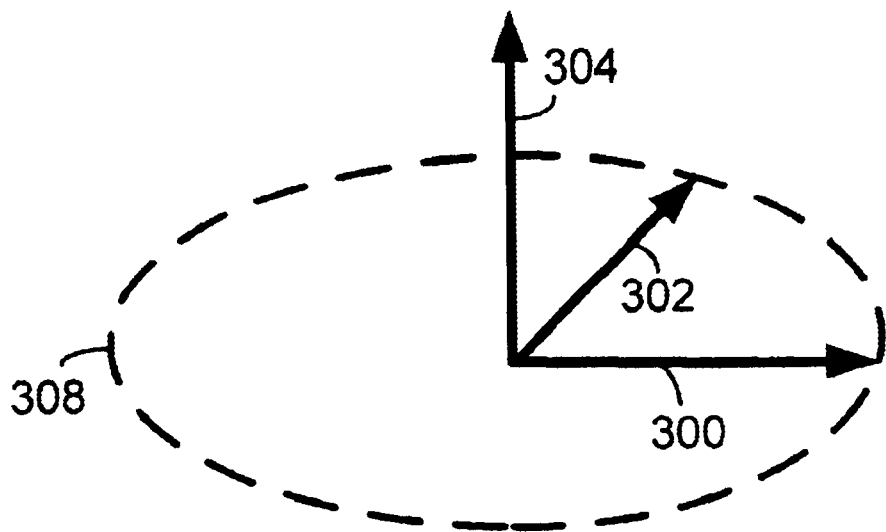

FIGS. 3A and 3B illustrate the results of rotating a three-axis electronic compass using a prior art compass calibration procedure for a three-axis electronic compass. The prior art calibration process requires rotating the three-axis electronic compass twice so that the three sensitive axes can experience a variation in the magnetic field. FIG. 3A includes a first sensitive axis (x-axis) 300, a second sensitive axis (y-axis) 302, and a third sensitive axis (z-axis) 304. The first sensitive axis (x-axis) 300, second sensitive axis (y-axis) 302, and third sensitive axis (z-axis) 304 are mutually orthogonal. The prior art compass calibration requires two rotational steps to obtain magnetic field variation in the first sensitive axis (x-axis) 300, the second sensitive axis (y-axis) 302, and the third sensitive axis (z-axis) 304. For example, FIG. 3A shows the results of a first rotational step that includes rotating the second sensitive axis (y-axis) 302 and the third sensitive axis (z-axis) 304 around the first sensitive axis (x-axis) 300. During the first rotational step, the second sensitive axis (y-axis) 302 and the third sensitive axis (z-axis) 304 traverse a circular path 306 around the first sensitive axis (x-axis) 300. The first sensitive axis (x-axis) 300 passes through the center of the circular path 306. By traversing a path around the first sensitive axis (x-axis) 300, the second sensitive axis (y-axis) 302 and the third sensitive axis (z-axis) 304 are able to experience a variation in magnetic fields acting on the three-axis electronic compass. In contrast, the first sensitive axis (x-axis) 300 rotates in place along its own axis as the second sensitive axis (y-axis) 302 and the third sensitive axis (z-axis) 304 rotate around the first sensitive axis (x-axis) 300. The first sensitive axis (x-axis) 300 does not experience a variation in the magnetic field acting on the three-axis electronic compass while rotating along its own axis.

The second rotational step of the prior art compass calibration process includes rotating either the second sensitive axis (y-axis) or the third sensitive axis (z-axis) along its respective axis and rotating the first sensitive axis (x-axis) and either the second sensitive axis (y-axis) or the third sensitive axis (z-axis) around the sensitive axis (second sensitive axis or third sensitive axis) which rotates along its respective axis. In FIG. 3B, the second rotational step includes rotating the first sensitive axis (x-axis) 300 and the second sensitive axis (y-axis) 302 around the third sensitive axis (z-axis) 304. Alternatively, the second rotational step could include rotating the first sensitive axis (x-axis) 300 and the third sensitive axis (z-axis) 304 around the second sensitive axis (y-axis) 302. During the second rotational step as shown, the first sensitive axis (x-axis) 300 and the second sensitive axis (y-axis) 302 traverse a circular path 308 around the third sensitive axis (z-axis) 304. The third sensitive axis (z-axis) 304 passes through the center of the circular path 308. By traversing a path around the third sensitive axis (z-axis) 304, the first sensitive axis (x-axis) 300 and the second sensitive axis (y-axis) 302 are able to experience a variation in magnetic fields acting on the three-axis electronic compass. In contrast, the third sensitive axis (z-axis) 304 rotates along its own axis as the first sensitive axis (x-axis) 300 and the second sensitive axis (y-axis) 302 rotate around the third sensitive axis (z-axis) 304. The third sensitive axis (z-axis) 304 does not experience a variation in the magnetic field acting on the three-axis electronic compass while rotating along its own axis.

Figure 4:
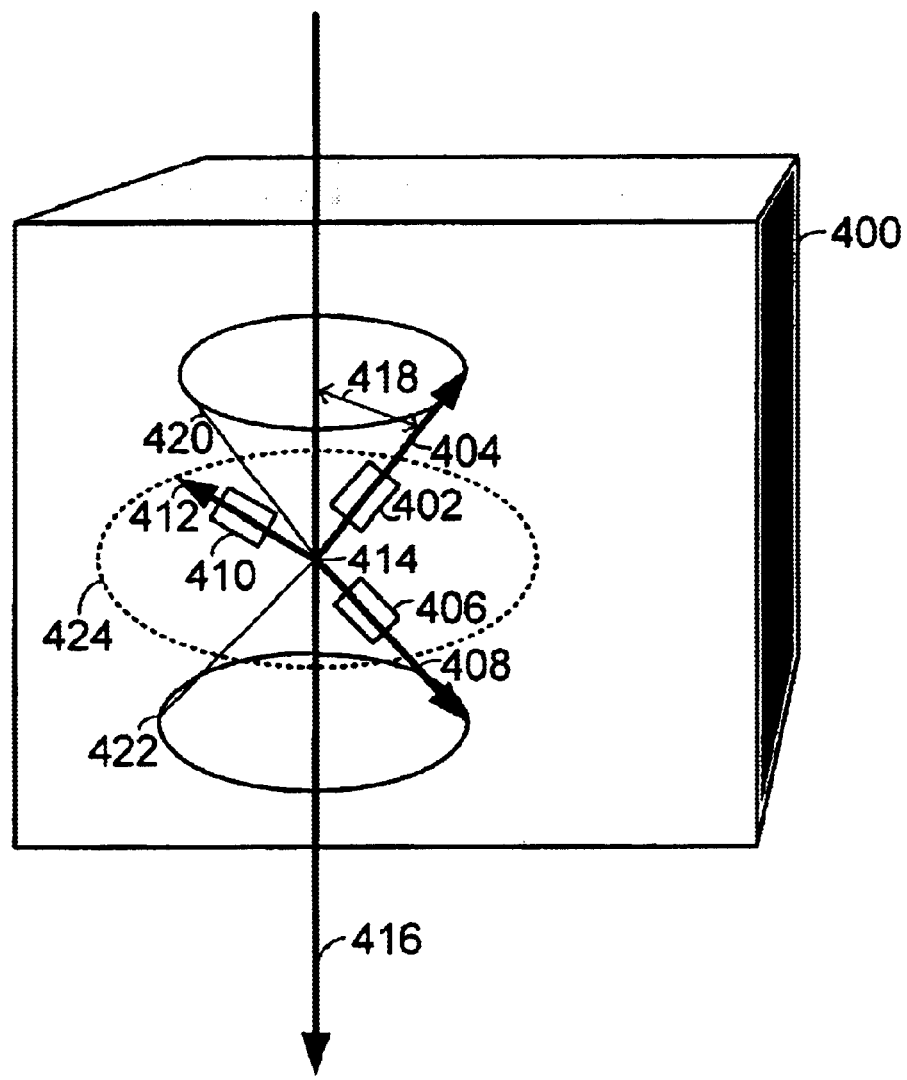
FIG. 4 illustrates paths traveled by the sensitive axes in a three-axis compass using a method of the present invention.

FIG. 4 illustrates an exemplary embodiment of a three-axis electronic compass for the present invention of acquiring calibration data for an electronic compass. In the figure, a three-axis electronic compass 400 includes a first magnetic field sensor 402 that includes a first sensitive axis (x-axis) 404, a second magnetic field sensor 406 that includes a second sensitive axis (y-axis) 408, and a third magnetic field sensor 410 that includes a third sensitive axis (z-axis) 412. The first sensitive axis (x-axis) 404, the second sensitive axis (y-axis) 408, and the third sensitive axis (z-axis) 412 reflect the sensing directions of the first, second, and third magnetic field sensors 402, 406, and 410 respectively. FIG. 4 illustrates that the first sensitive axis (x-axis) 404, the second sensitive axis (y-axis) 408, and the third sensitive axis (z-axis) 412 are substantially mutually orthogonal magnetic field sensor sensitive axes and illustrates the paths the three sensitive axes travel when rotating the electronic compass 400. Alternatively, the present invention may be carried out in a three axis compass with the first, second, and third sensitive axes 404, 408, and 412 in positions that are not substantially mutually orthogonal.

Arranging the first, second, and third magnetic field sensors 402, 406, and 410 within the electronic compass 400 may occur in a variety of ways. For example, in FIG. 4, the arrangement of the first, second, and third magnetic field sensors 402, 0.406, and 410 has the first sensitive axis (x-axis) 404, the second sensitive axis (y-axis) 408, and the third sensitive axis (z-axis) 412 intersecting at a common point 414. Other variations for arranging the first, second, and third magnetic field sensors 402, 406, and 410 are also available. For example, none or only two of the lines extending from the first sensitive axis (x-axis) 402, the second sensitive axis (y-axis) 404, and the third sensitive axis (z-axis) 406 may intersect. Furthermore, when one of the first sensitive axis (x-axis) 404, the second sensitive axis (y-axis) 408, and the third sensitive axis (z-axis) 412 is in a vertical position, the other two sensitive axes are in a horizontal position.

Acquiring calibration data for the three-axis electronic compass 400 according to the present invention includes positioning the electronic compass 400 so that the first sensitive axis (x-axis) 404 and a gravity vector 416 form an angle 418 that is greater than 0 degrees and less than 90 degrees. The gravity vector 416 is a vector passing through the electronic compass 400 that points to the center of earth regardless of the position or arrangement of the electronic compass 400. Alternatively, the second sensitive axis (y-axis) 408 or the third sensitive axis (z-axis) 412 could have been chosen as the sensitive axis that in combination with the gravity vector 416 form an angle greater than 0 degrees and less than 90 degrees. Furthermore, the second sensitive axis (y-axis) 408, and the third sensitive axis (z-axis) have respective positions with the gravity vector 416 as well. For example, as shown in FIG. 4, the second sensitive axis (y-axis) 408 and the gravity vector 416 form an angle greater than 0 degrees and less than 90 degrees and the third sensitive axis (z-axis) 412 and the gravity vector form an angle that is approximately 90 degrees. Still further, tilt information may be sent to a display to guide the user in positioning the compass in acquiring calibration data.

Acquiring the calibration data for the three-axis electronic compass 400 according to the present invention also includes moving the electronic compass 400 substantially 360 degrees around the gravity vector 416 so that the path of the first sensitive axis (x-axis) 404 forms a first cone 420. The first cone 420 forms as the first sensitive axis (x-axis) 404 travels around the gravity vector 416. The gravity vector 416 is the axis of the first cone 420. During the compass rotation, the second sensitive axis (y-axis) 408 and the third sensitive axis (z-axis) 412 also rotate around the gravity vector 416. The second sensitive axis (y-axis) 408 forms a second cone 422 with the gravity vector 416 as the axis of the second cone 422. The third sensitive axis (z-axis) 412 forms a circle around the gravity vector 416 as the third sensitive axis (z-axis) 412 traverses around the gravity vector. The gravity vector 416 passes through the center of the circle 424.

Acquiring the calibration data for the three-axis electronic compass 400 according to the present invention also includes measuring a magnetic field acting on the first sensitive axis (x-axis) 404, the second sensitive axis (y-axis) 408, and the third sensitive axis (z-axis) 412 while moving the electronic compass 400 in the substantially 360 degree path. Measuring the magnetic field may include measuring a combination of magnetic fields that combine to form a resultant magnetic field acting on the first sensitive axis (x-axis) 404, the second sensitive axis (y-axis) 408, and the third sensitive axis (z-axis) 412. Measuring the magnetic field may include measuring output signals of magnetic field sensors 402, 406, and 410 that reflect the magnetic field acting on the first, second, and third sensitive axes 404, 408, and 412. Measuring the magnetic field acting on the first sensitive axis (x-axis) 404, the second sensitive axis (y-axis) 408, and the third sensitive axis (z-axis) 412 allows calibration data to be obtained. The optimum calibration data is obtained when the angle 418 approaches 45 degrees. The first sensitive axis (x-axis) 404, the second sensitive axis (y-axis) 408, and the third sensitive axis (z-axis) 412 experience a maximum variation in the magnetic field as the electronic compass 400 is moving around the gravity vector 416 with angle 418 at 45 degrees. Measuring the magnetic field may occur at fixed intervals based on a sampling rate of a compass processor. Alternatively, measuring the magnetic field may occur at various intervals. For example, the compass may allow for discrete sampling by the compass user which allows the user to select when the magnetic field measurements are made.

The present invention provides for moving the electronic compass 400 in a variety of rotational movements around the gravity vector 416. For example, moving the electronic compass 400 around the gravity vector 416 may include a continuous motion until completing the 360 degree path around the gravity vector 416. Alternatively, moving the electronic compass 400 around the gravity vector 416 may be in a non-continuous motion. A non-continuous motion may include starting the compass movement, stopping the compass movement prior to the electronic compass 400 traveling 360 degrees around the gravity vector 416, and resuming the compass movement to complete the 360 degree path around the gravity vector 416. Moving the electronic compass 400 may include starting and stopping the electronic compass 400 movement multiple times while rotating the electronic compass 400 in the 360 degree path. Furthermore, the present invention allows for acquiring calibration data even if the compass is not moved substantially 360 degrees around the gravity vector. Positioning the compass so that each sensitive axis experiences a variation in the magnetic field while the compass rotates around the gravity vector and measuring the magnetic field at each sensitive axis to record the variation in the magnetic field is sufficient to obtain calibration data.

Acquiring the calibration data for the electronic compass 400 using the present invention may also include initiating a calibration mode. The calibration mode places the electronic compass 400 in a mode for calibrating the electronic compass 400. A variety of functions may occur upon initiating the calibration mode. For example, the calibration mode may prepare data storage in the electronic compass 400 for receiving current calibration data. Another exemplary function of the calibration mode is disabling algorithms for calculating a geographical direction. Yet another exemplary function of the calibration mode is changing a display of the electronic compass 400. Examples of calibration mode displays include an indication that the electronic compass 400 is operating in the calibration mode and a tilt indication with a target tilt value or range of tilt values to guide the user in positioning the compass for acquiring calibration data. Initiating the calibration mode may occur in a variety of ways. For example, the user of the electronic compass 400 may initiate the calibration mode by pressing a specific button on the electronic compass 400, pressing a combination of buttons on the electronic compass 400 in a specific sequence, or by a voice recognition command. Other methods of initiating the calibration mode are also available. Furthermore, the present invention also provides that the calibration mode may end after a specific event. For example, the calibration mode may end after moving the electronic compass 400 in a 360 degree path. Another example is ending the calibration mode after a specific amount of time has passed since initiating the calibration mode. Other methods for ending the calibration mode are also possible.

The method of positioning and rotating the electronic compass 400 may be achieved in a variety of ways. The method of positioning and rotating the electronic compass 400 may depend on the type of electronic compass. For example, the positioning and rotating of a hand-held electronic compass 400 may occur by positioning and rotating the compass by hand. Another example is to rotate and position the electronic compass 400 with a device. The device could simply be a dimple for finger placement, or a pivoting mechanism in a hand held device. Alternatively, the device can be an apparatus for arranging the compass so that the first sensitive axis (x-axis) 404 forms a first angle 418 with the gravity vector 416 that is greater than 0 degrees and less than 180 degrees. The device can further arrange the compass so that the second sensitive axis (y-axis) 408 and the gravity vector 416 form a second angle and the third sensitive axis (z-axis) 412 and the gravity vector 416 form a third angle. The second and third angles are greater than 0 degrees and less than 180 degrees. By forming the first, second, and third angles greater than 0 degrees and less than 180 degrees, the first sensitive axis (x-axis) 402, the second sensitive axis (y-axis) 408 and the third sensitive axis (z-axis) 412 all experience variation in the magnetic field when rotating the compass around the gravity vector. After positioning the electronic compass 400 to form the first, second, and third angles, the device can rotate the electronic compass 400 in a substantially 360 degree path and keep the first, second, and third angles fixed through the 360 degree path. Other methods for positioning and rotating the compass are also available.

Figure 5:
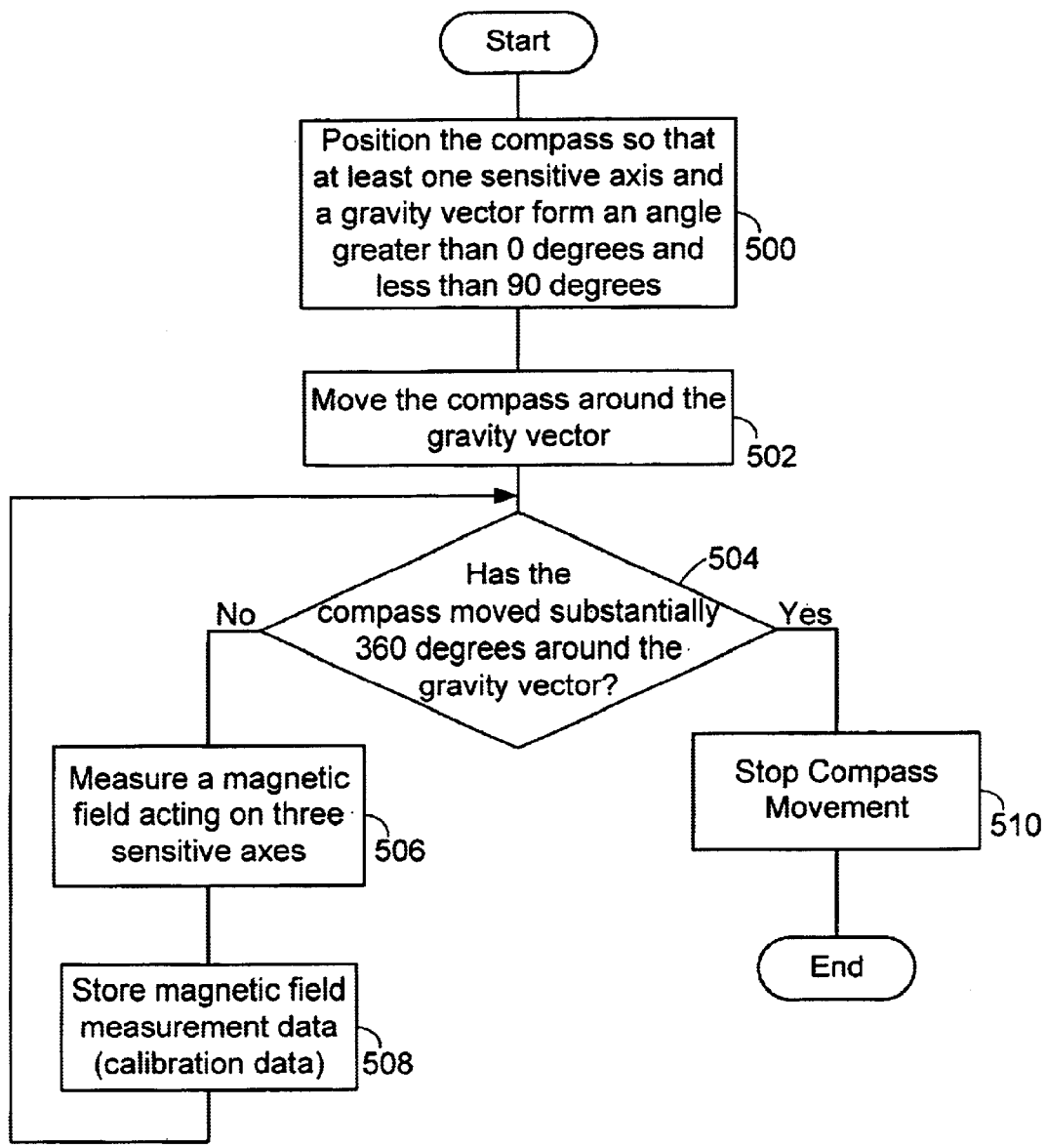
FIG. 5 is a flow diagram of an exemplary method of acquiring calibration data with an electronic compass with the present invention.

FIG. 5 shows a process flow for acquiring calibration data for an electronic compass. Block 500 provides for positioning a compass in relation to a gravity vector so that a sensitive axis of the compass and the gravity vector form an angle that is greater than 0 degrees and less than 90 degrees. The optimum calibration data is available when the angle is approximately 45 degrees. Block 502 provides for moving the compass around the gravity vector. Ideally, the compass is moved 360 degrees around the gravity vector so that the compass experiences the effects of a magnetic field in all compass directions. However, moving the compass 360 degrees around the gravity vector is not essential to acquiring a set of calibration data in which all sensitive axes experience variation in the magnetic field. Moving the compass in a complete 360 degree path around the gravity vector causes the sensitive axis forming the angle greater than 0 degrees and less than 90 degrees to form a cone. The gravity vector is the axis of the cone. In block 504, a decision is to be made whether or not the compass has moved substantially 360 degrees around the gravity vector. If the compass has not moved substantially 360 degrees around the gravity vector, the method includes performing blocks 506 and 508. Block 506 provides for measuring a magnetic field acting on the three sensitive axes. The magnetic field may be a resultant magnetic field that is a combination of the Earth's magnetic field and stray magnetic fields acting on the three sensitive axes. Block 508 provides for storing magnetic field measurement data (calibration data). The function of storing magnetic field measurement data may include storing the raw measurement data or storing some data derived from the raw magnetic field measurement data. Further, the function of storing magnetic field measurement data (calibration data) may include storing a subset of the raw magnetic field measurements or a subset of data derived from the raw magnetic field measurement data. An example of a subset of calibration data is initial values of magnetic field measurement data and subsequent values of magnetic field measurement data in which there has been an amount of change in the measurement data from the most recently stored measurement data for at least one sensitive axis. The amount of change may be some amount of change above a minimum threshold. A variety of data storage devices are available for storing calibration data on or off board the compass. Exemplary data storage devices include Random Access Memory (RAM) devices and EEPROM devices. Other types of data storage devices are also available. After the compass has moved substantially 360 degrees around the gravity vector, an affirmative answer at block 504 leads to block 510 where the compass movement is stopped. After the compass has moved substantially 360 degrees, the compass uses the stored calibration data to determine one or more calibration coefficients in order to calibrate the compass.

Exemplary embodiments of the present invention have been described above. Those skilled in the art will understand, however, that changes and modifications may be made to this embodiment without departing from the true scope and spirit of the invention, which is defined by the claims.

I claim:

1. A method of acquiring calibration data for an electronic compass comprising a first sensitive axis, a second sensitive axis, and a third sensitive axis, the method comprising:

positioning the compass so that the first sensitive axis and a gravity vector form an angle greater than 0 degrees and less than 90 degrees;

moving the compass in a substantially 360 degree path around the gravity vector, whereby the first sensitive axis traverses a path generally forming a cone, and wherein the gravity vector is approximately an axis of the cone; and measuring a magnetic field acting on the first, second, and third sensitive axes while moving the compass in the substantially 360 degree path to acquire the calibration data.

2. The method of claim 1, wherein the angle is approximately 45 degrees.

3. The method of claim 1, wherein moving the compass in the substantially 360 degree path comprises moving the compass in a generally continuous motion.

4. The method of claim 1, wherein moving the compass in the substantially 360 degree path includes moving the compass in a non-continuous motion, wherein the non-continuous motion includes stopping and restarting movement of the compass at least one time before completing the movement of the compass in the substantially 360 degree path.

5. The method of claim 1, wherein measuring the magnetic field includes sampling a first output signal that reflects the magnetic field acting on the first sensitive axis, sampling a second output signal that reflects the magnetic field acting on the second sensitive axis, and sampling a third output signal that reflects the magnetic field acting on the third sensitive axis.

6. The method of claim 5, wherein the first, second, and third sensitive axes are within one or more magnetic field sensors, and wherein the one or more magnetic field sensors produce the first, second, and third output signals.

7. The method of claim 6, wherein the calibration data includes values of the first, second, and third output signals obtained by sampling the first, second, and third output signals.

8. The method of claim 7, wherein the first, second, and third output signals are single-ended output signals.

9. The method of claim 7, wherein the first, second, and third output signals are differential output signals.

10. The method of claim 7, wherein the first, second, and third output signals are digital output signals.

11. The method of claim 7, wherein the calibration data includes approximately 100 values of the first, second, and third output signals.

12. The method of claim 7, further comprising storing the calibration data in data storage.

13. The method of claim 12, further comprising initiating a calibration mode.

14. The method of claim 1, further comprising sending tilt information to a display to guide the user in positioning the compass.

15. A method of acquiring calibration data for an electronic compass comprising a first, second, and third sensitive axis, wherein the compass produces first, second, and third output signals that reflect a magnetic field acting on the first, second, and third sensitive axes respectively, the method comprising:

positioning the compass so that the first, second, and third sensitive axes are not parallel with a gravity vector passing through the compass;

moving the compass in a substantially 360 degree path around the gravity vector, wherein at least one of the first, second, and third sensitive axes traverses a path forming substantially a cone, and wherein the gravity vector is approximately the axis of the cone; and sampling the first, second, and third output signals while the compass is moving in the substantially 360 degree path to obtain values of first, second, and third output signals, wherein the calibration data are the values of the first, second, and third output signals.

16. The method of claim 15, further comprising storing the calibration data in data storage.

17. The method of claim 16, wherein the first, second, and third sensitive axes are mutually orthogonal.

18. The method of claim 17, wherein one of the first, second, and third sensitive axes is in a vertical position when the other two sensitive axes are in a horizontal position.

19. A system for maneuvering a compass having a first, second, and third sensitive axis, the system comprising: a device for positioning and rotating the compass, wherein positioning the compass includes arranging the first sensitive axis to form a first angle with a gravity vector, arranging the second sensitive axis to form a second angle ith the gravity vector, and arranging the third sensitive axis to form a third angle with the gravity vector, wherein the first, second, and third angles are greater than 0 degrees and less than 180 degrees, and wherein the device rotates the compass in a substantially 360 degree path around the gravity vector while keeping the first, second, and third angles approximately fixed.

20. The system of claim 19, wherein the device includes a first component to position the compass and a second component to rotate the compass.

21. The system of claim 20, wherein the device further comprises a display to guide the user in positioning the compass for acquiring calibration data.

22. The system of claim 19, wherein the device for positioning and rotating the compass further comprises the means for positioning and rotating a plurality of compasses simultaneously.

23. The system of claim 19, wherein the first angle is approximately 45 degrees.

24. The system of claim 19, wherein the device stops rotating the compass after the compass has moved in the substantially 360 degree path.

\* \* \* \* \*

UNITED STATES PATENT AND TRADEMARK OFFICE
CERTIFICATE OF CORRECTION

PATENT NO. : 6,877,237 B1
DATED : April 12, 2005
INVENTOR(S) : Lakshman S. Withanawasam It is certified that error appears in the above-identified patent and that said Letters Patent is hereby corrected as shown below:

<u>Column 8,</u>
Line 23, the drawing reference "0.406" should be changed to -- 406 --.

<u>Column 13,</u>
Line 3, the word "ith" should be changed to -- with --.

Signed and Sealed this

Thirteenth Day of September, 2005

JON W. DUDAS
*Director of the United States Patent and Trademark Office*